US010686390B2

(12) United States Patent
Peng et al.

(10) Patent No.: US 10,686,390 B2
(45) Date of Patent: Jun. 16, 2020

(54) FIXED ROTATION DIRECTION START-UP METHOD FOR SINGLE-PHASE SENSORLESS DC BRUSHLESS MOTOR

(71) Applicant: TRITAN TECHNOLOGY INC., Hsinchu County (TW)

(72) Inventors: Sheng-Yu Peng, Hsinchu County (TW); Pi-Cheng Chen, Hsinchu County (TW); Shun-Sheng Cheng, Hsinchu County (TW); Shao-Hua Cheng, Hsinchu County (TW); Huang-Jen Wang, Hsinchu County (TW)

(73) Assignee: TRITAN TECHNOLOGY INC., Hsinchu County (TW)

( * ) Notice: Subject to any disclaimer, the term of this patent is extended or adjusted under 35 U.S.C. 154(b) by 88 days.

(21) Appl. No.: 16/125,816

(22) Filed: Sep. 10, 2018

(65) Prior Publication Data
US 2020/0083824 A1    Mar. 12, 2020

(51) Int. Cl.
| H02P 6/16 | (2016.01) |
| H02P 6/22 | (2006.01) |
| H02P 6/26 | (2016.01) |
| H02P 6/18 | (2016.01) |
| H02P 1/46 | (2006.01) |

(52) U.S. Cl.
CPC ............ *H02P 6/22* (2013.01); *H02P 1/465* (2013.01); *H02P 6/188* (2013.01); *H02P 6/26* (2016.02)

(58) Field of Classification Search
CPC .... H02P 6/22; H02P 6/26; H02P 6/188; H02P 1/465
See application file for complete search history.

(56) References Cited

U.S. PATENT DOCUMENTS

| 2002/0171381 | A1* | 11/2002 | Miyazaki | ................ H02P 6/182 |
| | | | | 318/400.13 |
| 2008/0100243 | A1* | 5/2008 | Kurosawa | .......... G11B 19/2054 |
| | | | | 318/430 |
| 2010/0090631 | A1* | 4/2010 | Yang | ........................ H02P 6/18 |
| | | | | 318/400.33 |

* cited by examiner

*Primary Examiner* — Muhammad S Islam
(74) *Attorney, Agent, or Firm* — Lin & Associates Intellectual Property, Inc.

(57) ABSTRACT

Utilizing an asymmetric magnetic field caused by a mechanism design between a motor rotor and a stator to induce a BEMF, a method for starting a fixed rotation direction of single-phase sensorless DC brushless motor, includes: power-on starting a motor control circuit; if the motor is not in a rotating state before starting the excitation, executing a static starting procedure; then, if the motor rotation direction conforms to a predetermined direction, executing a normal driving procedure; otherwise, executing a static starting procedure. The static starting procedure, by discharging remnant energy of the motor, achieves the purpose of star-up by performing the steps of first phase excitation, stop excitation, and strong second phase excitation. In the normal driving procedure, the slope of BEMF signal of the first phase or the second phase is taken out periodically to detect the motor rotation direction.

10 Claims, 8 Drawing Sheets

FIXED ROTATION DIRECTION START-UP METHOD FOR SINGLE-PHASE SENSORLESS DC BRUSHLESS MOTOR

TECHNICAL FIELD

The technical field generally relates to a fixed rotation direction start-up method for single-phase sensorless direct current (DC) brushless motor.

BACKGROUND

A typical direct current (DC) brushless motor drive may use a position sensing device, such as, a Hall effect or an optical sensor, to detect the instantaneous position of its rotor and thereby control the electronic switch to perform current direction change. However, the use of position sensors increases cost and reduces system reliability. Therefore, in recent years, various efforts have been made to remove the use of a position sensor in a brushless motor drive.

Therein, the back electromotive force (BEMF) signal is most commonly used in the sensorless motor technology. Since the BEMF varies according to the position and rotational speed of the rotor, the BEMF signal is used to determine the actual position of the rotor. However, the sensorless technology is mostly used for three-phase DC brushless motor drive. The main reason is that the three-phase drive motor is only turned on at two points at any single time, and therefore the other point can be used as BEMF signal measurement. Once the motor begins to rotate, the rotor position can be detected through the inductive BEMF on the stator winding. By processing these BEMF signals, in addition to determining the actual position of the rotor, it is also possible to control the switching of the excitation current of the respective stator winding coils for commutation. On the other hand, since there is no available effective BEMF signal measurement method for single-phase DC brushless motors, a suitable sensorless technology solution to solve the above-mentioned problems associated with the use of position sensors is yet proposed so far.

SUMMARY

The present invention utilizes an unbalanced (asymmetric) magnetic field caused by a mechanism design between a motor rotor and a stator to induce a back electromotive force signal (BEMF), and proposes a fixed rotation direction start-up method of a single-phase sensorless DC brushless motor, to solve the problem wherein the sensorless single-phase DC brushless motor in the prior art cannot ensure the starting rotation in the fixed direction.

An embodiment of the present invention provides a fixed rotation direction start-up method for a single-phase sensorless DC brushless motor, comprising the following steps:

Step S101: powering up to activate a motor control circuit of a motor;

Step S102: confirm whether the motor is in a rotating state before activation of an excitation? If yes, proceed to step S103; otherwise, executing a static start-up procedure;

Step S103: determining a rotation direction of the motor;

Step S104: determining whether the rotation direction of the motor conforming to a predetermined direction; if yes, executing a normal driving procedure; otherwise, executing the static start-up procedure.

In a preferred embodiment, the static start-up procedure further comprises the following steps:

Step S110: discharging remnant energy;

step S111: confirming that the motor having no remnant energy; if yes, executing step S112; otherwise, returning to step S110;

step S112: performing a first phase (PH1) excitation and calibrating rotor of the motor;

step S113: stopping the first phase excitation;

step S114: performing a strong second phase (PH2) excitation;

step S115: confirming whether the expected commutation condition occurs; if yes, executing the normal driving procedure; otherwise, performing step S116;

step S116: confirming whether exceeding a predetermined waiting time; if yes, return to step S110; otherwise, return to step S115.

In a preferred embodiment, the normal driving procedure further comprises the following steps:

Step S120: waiting for commutation;
Step S121: performing first phase excitation;
Step S122: waiting for commutation;
Step S123: performing second phase excitation.

In a preferred embodiment, the fixed rotation direction start-up method for a single-phase sensorless DC brushless motor may further comprises: extracting a first phase or a second phase BEMF signal periodically in the normal driving procedure, and determining a slope of the BEMF signal to determine the rotation direction of the motor.

In summary, the fixed rotation direction start-up method for single-phase sensorless DC brushless motor disclosed in the present invention utilizes an asymmetric magnetic field caused by a mechanism design between a rotor and a stator of the motor to induce a back electromotive force signal to solve the problem in the prior art wherein the single-phase sensorless DC brushless motor is unable to ensure a fixed direction rotation when starting up.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
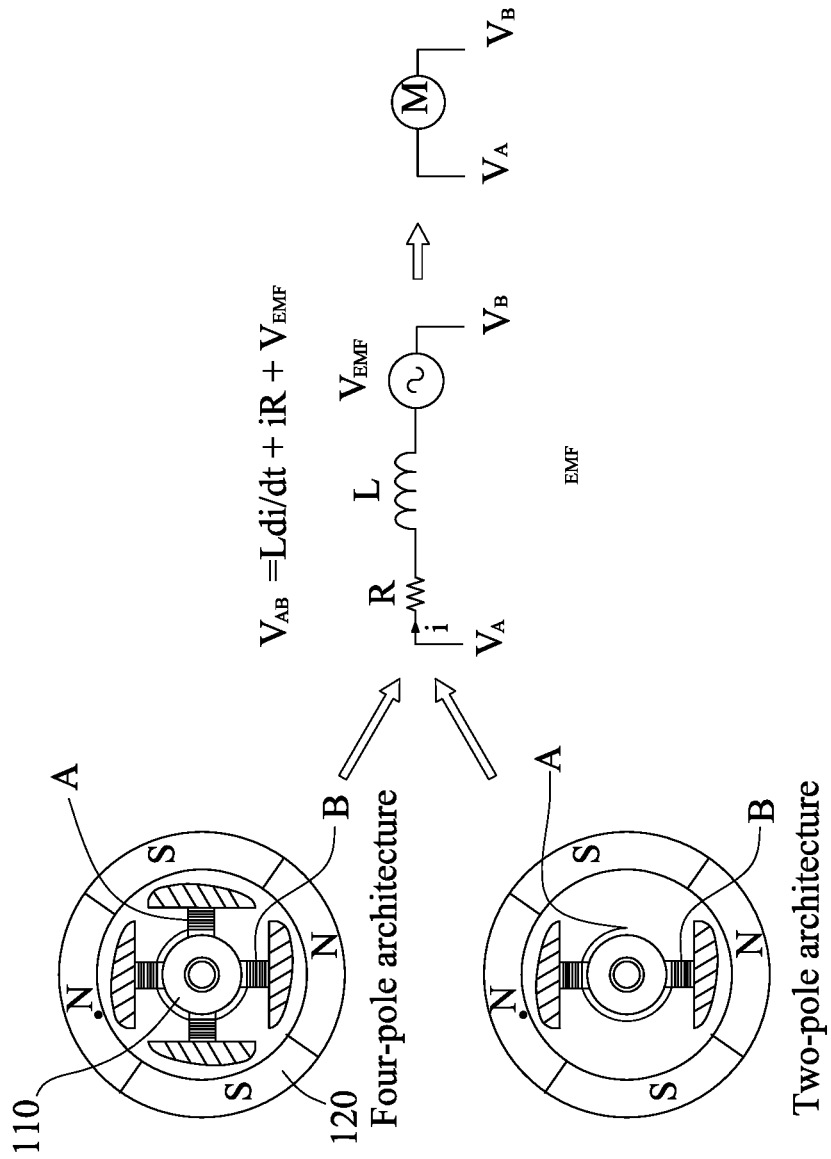
FIG. 1 shows a schematic view of the structure of a single-phase DC brushless motor and an equivalent circuit thereof applicable to the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 shows a schematic view of the structure of a single-phase DC brushless motor and an equivalent circuit thereof applicable to the present invention. As shown in FIG. 1, a single-phase brushless DC motor mainly comprises: a stator 110 and a rotor 120 composed of permanent magnets; the rotor 120 and the stator 110 may be two poles, four poles, or six poles, and so on. FIG. 1 shows the architecture of two poles and four poles. The single-phase DC brushless motor comprises two motor terminals A and B, and as shown in FIG. 1, $V_A$ and $V_B$ represent voltage values at the motor terminals A and B, respectively. The equivalent circuit is represented by a resistor R, an inductor L, and a voltage source $V_{EMF}$, in other words, $V_{AB}=Ldi/dt+iR+V_{EMF}$; wherein the voltage source $V_{EMF}$ is the induced back electromotive force.

It should be noted that, as shown in FIG. 1, the mechanism between the rotor 120 and the stator 110 of the motor is designed to create an unbalanced (asymmetric) magnetic field. The present invention utilizes the asymmetric magnetic field to sense a counter electromotive force signal to determine whether the motor is in a rotating state and rotation direction thereof.

Figure 2:
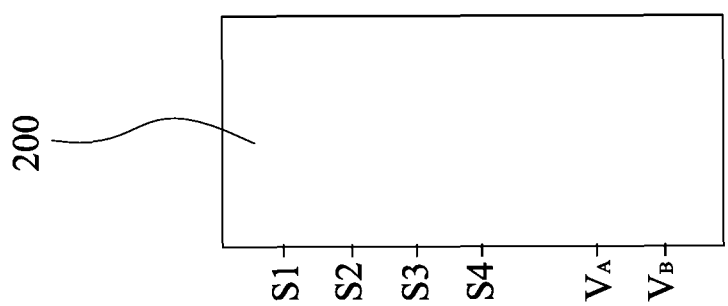
FIG. 2 shows a schematic view of the single-phase DC brushless motor and the control circuit according to the present invention.
Figure 2:
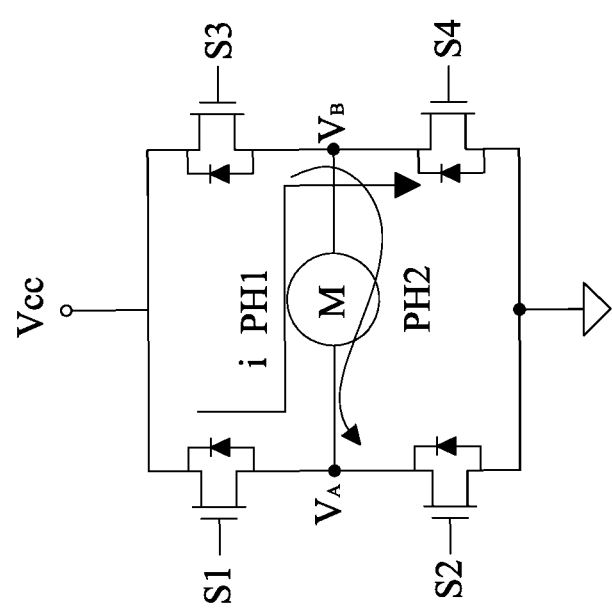

FIG. 2 shows a schematic view of the single-phase DC brushless motor and the control circuit according to the present invention. As shown in FIG. 2, the control circuit of the single-phase DC brushless motor comprises a first switch S1, a second switch S2, a third switch S3, a fourth switch S4, and a controller 200; wherein the first switch S1 and the second switch S2 are connected in series, the third switch S3 and the fourth switch S4 are connected in series, and the series connection points are electrically connected to the two terminals (A, B) of the single-phase DC brushless motor respectively. The controller 200 respectively controls the first switch S1, the second switch S2, the third switch S3, and the fourth switch S4 by providing a first switch control signal, a second switch control signal, a third switch control signal, and a fourth switch control signal. The controller 200 also provides two excitation voltages $V_A$, $V_B$ to the two terminals A, B of the single-phase DC brushless motor.

It should be noted that FIG. 2 also defines a first phase PH1 and a second phase PH2; wherein the first phase and the second phase respectively mean two configurations of the voltage difference between the terminals A and B of the single-phase DC brushless motors, that is, $V_A>V_B$, and $V_A<V_B$. For convenience of explanation, the following description defines the first phase as $V_A>V_B$ and the second phase as $V_A<V_B$. However, in other embodiments, the first phase may also be defined as $V_A<V_B$ and the second phase as $V_A>V_B$. The configuration of $V_A=V_B$ represents a commutation.

Figure 3A:
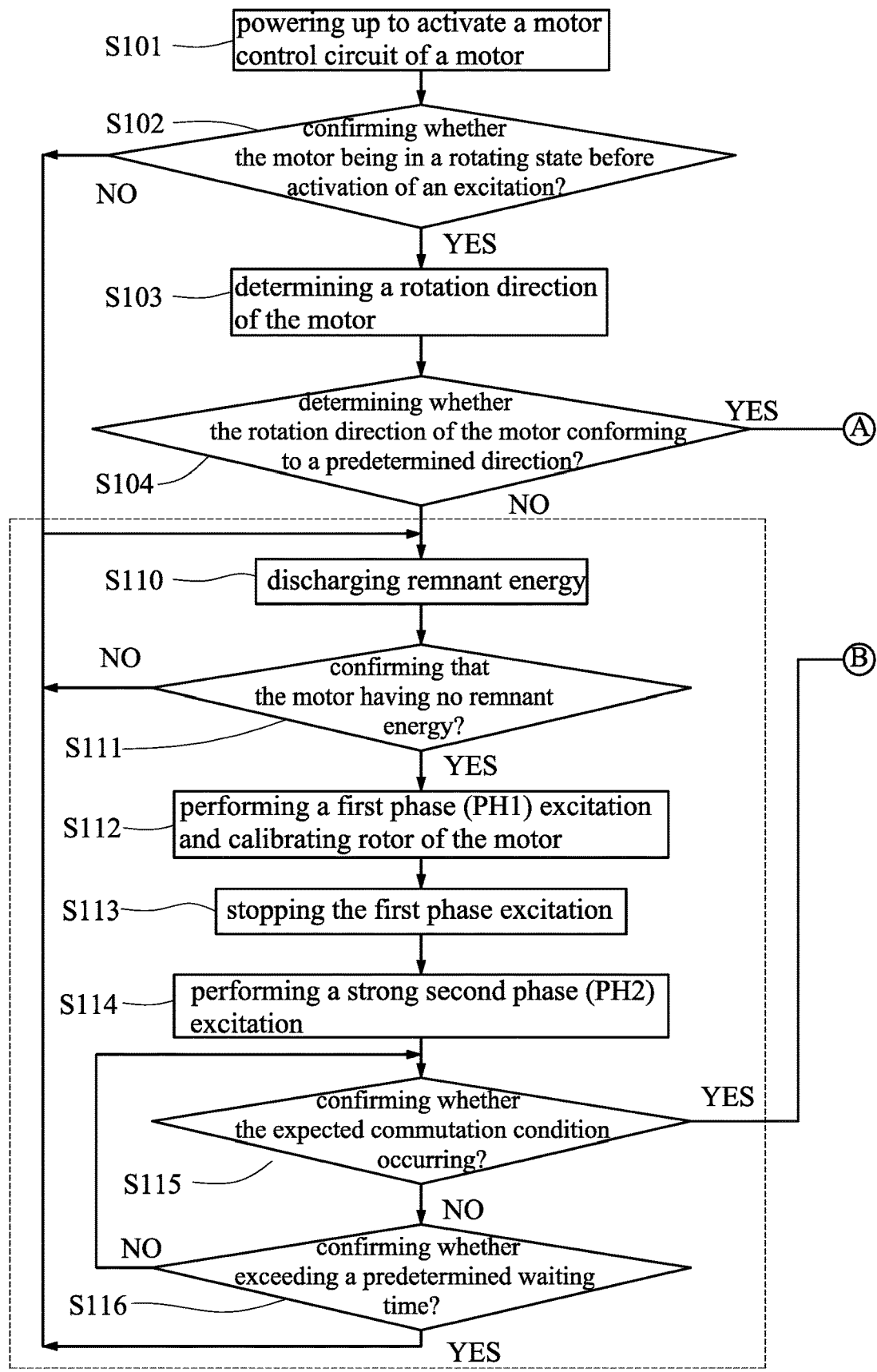
FIGS. 3A-3B show a schematic view of the flowchart of the fixed rotation direction start-up method for single-phase sensorless DC brushless motor of the present invention.
Figure 3B:
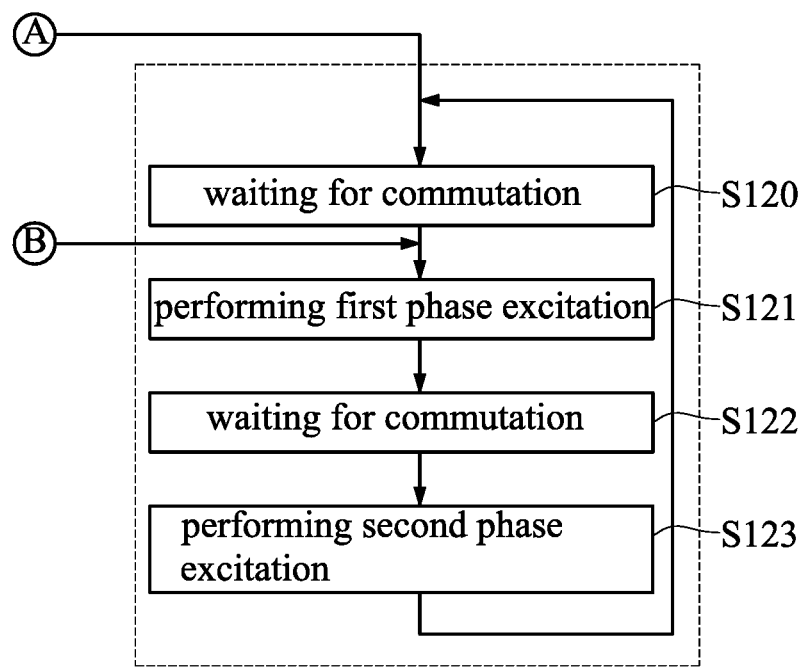

Based on the above control circuit, the present invention provides a fixed rotation direction start-up method for single-phase sensorless DC brushless motor. FIGS. 3A-3B shows a schematic view of the flowchart of the fixed rotation direction start-up method for single-phase sensorless DC brushless motor of the present invention, comprising the following steps:

Step S101: powering up to activate a motor control circuit of a motor;

Step S102: confirm whether the motor is in a rotating state before activation of an excitation? If yes, proceed to step S103; otherwise, executing a static start-up procedure;

Step S103: determining a rotation direction of the motor;

Step S104: determining whether the rotation direction of the motor conforming to a predetermined direction; if yes, executing a normal driving procedure; otherwise, executing the static start-up procedure.

It should be noted that the single-phase sensorless DC brushless motor may be in a rotating state prior to the official excitation (power-on activation) procedure, for example, in a reversal rotation state in a returning wind environment, or in a forward rotation state due to residual kinetic energy or in a downwind state; therefore, the method of the present invention must detect whether the single-phase sensorless DC brushless motor is in a rotating state after starting the control circuit (step S102).

In an actual application, whether the induced BEMF (the terminal voltage difference between $V_A$ and $V_B$) is greater than a predetermined threshold can be measured. If the terminal voltage difference between $V_A$ and $V_B$ is greater than the predetermined threshold, the motor may be determined to be in a rotating state, then step S103 is performed to determine the rotation direction of the motor; otherwise, the motor is in a stationary state, so performing a static start-up procedure.

Figure 4:
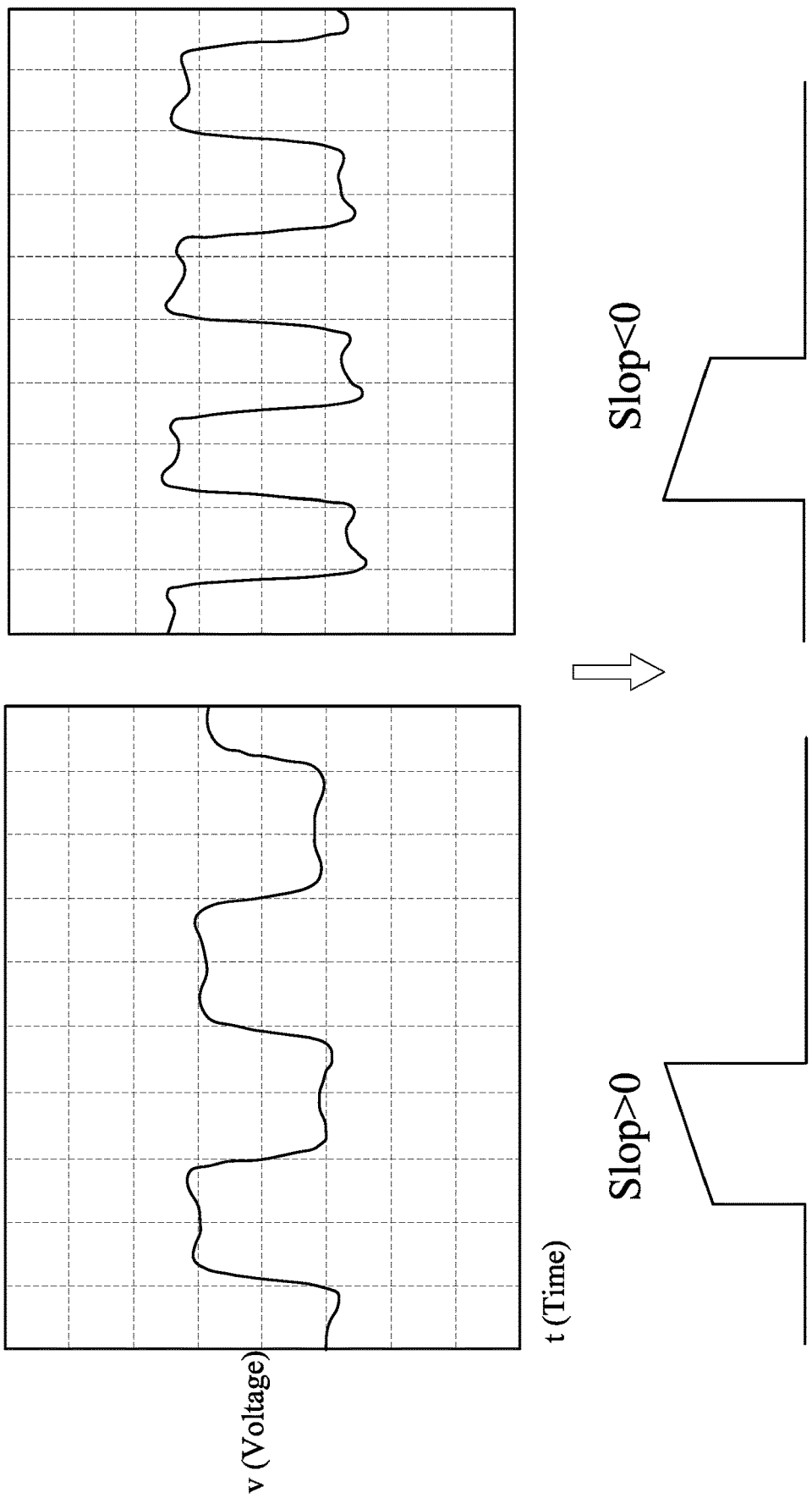
FIG. 4 shows a schematic view of the slope of the BEMF signal waveform in the fixed rotation direction start-up method for single-phase sensorless DC brushless motor of the present invention.

In step S103, a specific manner of determining the rotation direction of the motor is by calculating the slope of the back electromotive force signal. As the back electromotive force signal waveform shown in FIG. 4, when the left peak is lower than the right peak, the back electromotive force signal slope is positive, indicating that the rotation direction is clockwise; conversely, when the left peak is higher than the right peak, the slope of the back electromotive force signal is negative, indicating that the direction of rotation is counterclockwise.

In step S104, when the motor rotation direction conforms to the predetermined direction, the motor rotation may be continuously driven by continuing to execute a normal driving procedure; otherwise, the static start-up procedure is performed to adjust the rotation direction.

Figure 5:
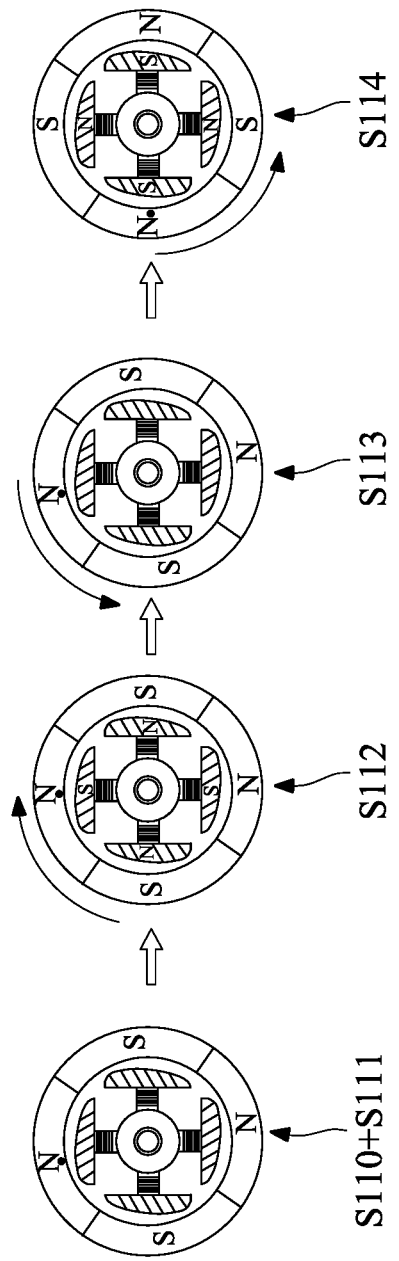
FIG. 5 shows a schematic view of the static start-up procedure in the fixed rotation direction start-up method for single-phase sensorless DC brushless motor of the present invention.
Figure 6:
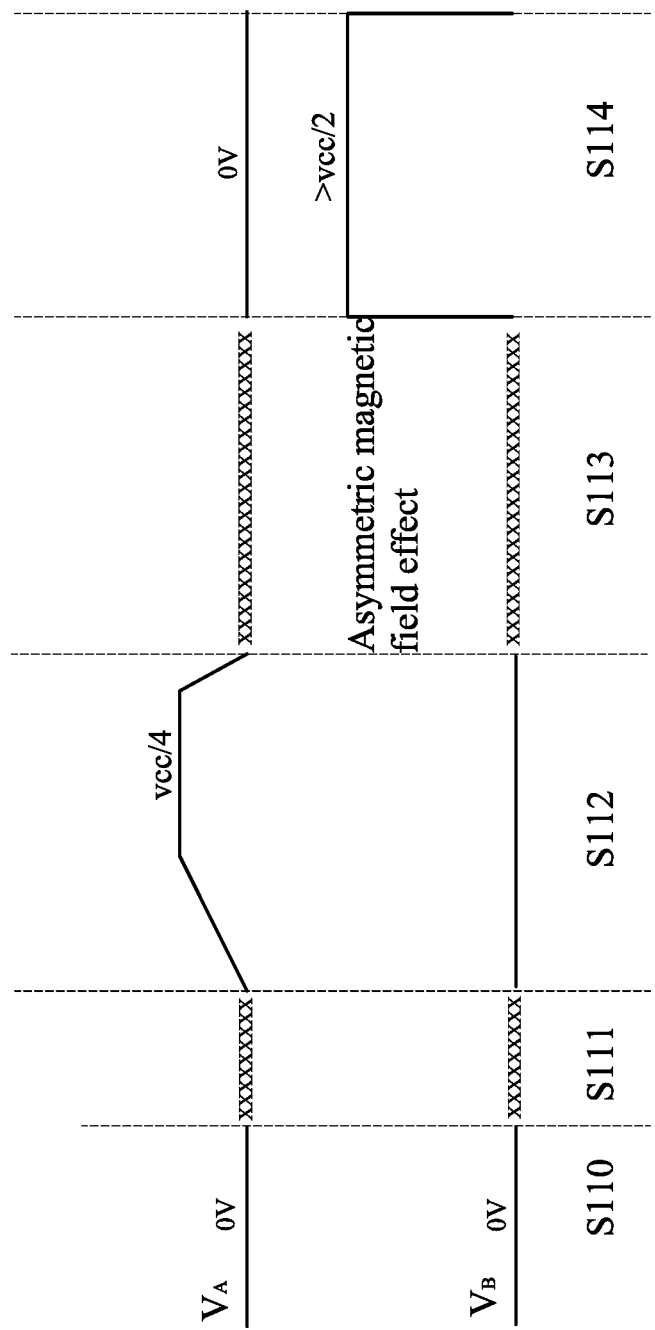
FIG. 6 shows a schematic view of the control waveform for the motor terminal in the static start-up procedure of the fixed rotation direction start-up method for single-phase sensorless DC brushless motor of the present invention.

Refer to FIG. 5 and FIG. 6. FIG. 5 shows a schematic view of the static start-up procedure in the fixed rotation direction start-up method for single-phase sensorless DC brushless motor of the present invention; FIG. 6 shows a schematic view of the control waveform for the motor terminal in the static start-up procedure of the fixed rotation direction start-up method for single-phase sensorless DC brushless motor of the present invention.

Accordingly, as shown in FIG. 3A, the static start-up procedure comprises the following steps:

Step S110: discharging remnant energy;

step S111: confirming that the motor having no remnant energy; if yes, executing step S112; otherwise, returning to step S110;

step S112: performing a first phase (PH1) excitation and calibrating rotor of the motor;

step S113: stopping the first phase excitation;

step S114: performing a strong second phase (PH2) excitation;

step S115: confirming whether the expected commutation condition occurs; if yes, executing the normal driving procedure; otherwise, performing step S116;

step S116: confirming whether exceeding a predetermined waiting time; if yes, return to step S110; otherwise, return to step S115.

It should be noted that the purpose of step S110 and step S111 is to completely discharge the remnant energy in the motor, including kinetic energy, magnetic energy, and electrical energy; for example, as described earlier, in a reversal rotation state in a returning wind environment, or in a forward rotation state due to residual kinetic energy or in a downwind state. Therefore, whether the execution of the method proceeds to this step from step 102 (the motor is in a stationary state) or from step S104 (the rotation of the motor does not conform to the predetermined direction), the motor no longer has remnant energy after step S110 and step S111. Wherein, the specific manner of detecting the complete discharge of the remnant energy in the motor can be realized by detecting whether the terminal voltage is $V_A=V_B=0$. At this point, the method of the present invention enters a procedure for starting the motor from an approximately stationary state.

First, the first phase (PH1) excitation is performed in step S112, and the rotor is calibrated (that is, the rotor and the magnetic pole of the stator are aligned); wherein the excitation is defined as an excitation voltage is provided by the aforementioned controller to the terminal of the single-phase DC brushless motor. Therefore, in the present embodiment, the first phase excitation means that the controller provides an excitation voltage to the A terminal of the motor, and the second phase excitation means that the controller provides an excitation voltage to the B terminal of the motor. It is worth noting that the excitation voltage provided by the controller is ramped up and down with a gentle slope, and the voltage is also small, for example, about one quarter of the voltage source Vcc, mainly to avoid motor oscillation, jitter, residual inertial kinetic energy, which in turn affects the operation of asymmetric magnetic fields. Next, the excitation is stopped in step S113, and the unbalanced magnetic field caused by the asymmetric mechanism causes the rotor inertia deflection to function. Then, a strong second phase excitation is performed in step S114; here, the strong excitation means that the controller supplies a higher voltage excitation voltage to the B terminal of the motor (second phase), for example, about half of the voltage source Vcc. In other words, the result of this strong commutation excitation will cause the rotor torque to increase to provide a sufficient back electromotive force.

Step S115 is to confirm whether the motor is expected to have a commutation condition; if so, the motor has successfully started to rotate according to the predetermined direction, and thus the method of the present invention enters the normal driving state and executes the normal driving procedure; otherwise, step 116 is executed to confirm whether the predetermined waiting time is exceeded; if yes, return to step S110, re-execute the entire static start-up procedure, and then completely discharge the remnant energy of the motor; otherwise, return to step S115 to confirm whether the motor is expected to be commutation to occur.

Accordingly, as shown in FIG. 3B, the normal driving procedure further comprises the following steps:

Step S120: waiting for commutation;
Step S121: performing first phase excitation;
Step S122: waiting for commutation;
Step S123: performing second phase excitation.

It should be noted that the specific implementation manner of waiting for commutation in step S120 and step S122 can be implemented by detecting whether the terminal voltage difference $V_A-V_B$ is 0. The steps of performing the first phase excitation and the performing the second phase excitation in steps S121 and S123 respectively means that the controller 200 sequentially provides an excitation voltage to the two terminals A, B of the motor; and steps S120-S123 form a loop; that is, the normal driving procedure comprises the cycle of repeating steps S120-S123. Specifically, in the step S115 of the above-described static start-up procedure, if the motor has an expected commutation condition, the method proceeds to step S121 in the normal driving procedure; in other words, the method enters the cycle of the commutation excitation.

Figure 7:
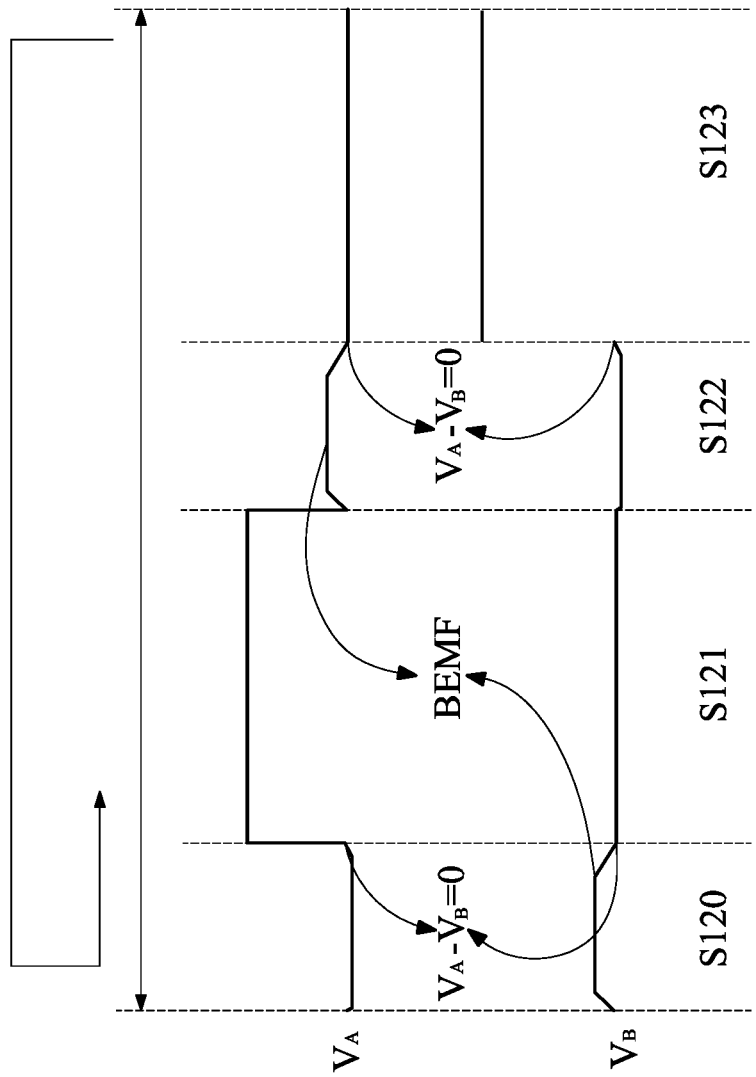
FIG. 7 shows schematic view of the control waveform for the motor terminal in the normal driving procedure of the fixed rotation direction start-up method for single-phase sensorless DC brushless motor of the present invention.

Referring to FIG. 7, FIG. 7 shows schematic view of the e control waveform for the motor terminal in the normal driving procedure of the fixed rotation direction start-up method for single-phase sensorless DC brushless motor of the present invention. Also referring to FIG. 6, steps S120-S123 form a loop, and the specific embodiment of waiting for commutation in steps S120 and S122 can be implemented by detecting the terminal voltage difference $V_A-V_B=0$. Furthermore, the excitation voltage supplied by the controller 200 is equivalent to the voltage values of the two terminals A and B of the motor, as shown in step S121 and step S123.

The fixed rotation direction start-up method for single-phase sensorless DC brushless motor of the present invention may further comprise: extracting the back electromotive force signal under first phase (PH1) or the second phase (PH2) excitation periodically in the normal driving procedure to determine the slope of the back electromotive force signal to know the rotation direction because the slope of the back electromotive force signal generated by the asymmetric magnetic field is different. In other words, after step S120 or step S122, step S103 is performed to detect the slope of the back electromotive force signal to know the rotation direction of the motor, and then step S104 and the like are sequentially performed, and so on.

In summary, the present invention utilizes an asymmetric magnetic field caused by a mechanism between a rotor and a stator pf a motor to induce a back electromotive force signal, and discloses a fixed rotation direction start-up method for single-phase sensorless DC brushless motor, comprising: powering up to activate a motor control circuit of a motor; confirming whether the motor is in a rotating state before activation of an excitation? if not, executing a static start-up procedure; determining a rotation direction of the motor; determining whether the rotation direction of the motor conforming to a predetermined direction; if yes, executing a normal driving procedure; otherwise, executing the static start-up procedure. The static start-up program achieves the static starting up by discharging the remnant energy of the motor, performing the steps of first phase excitation, stop excitation, followed by a strong second phase excitation, and so on. In the normal driving procedure, the back electromotive force signal under first phase (PH1) or the second phase (PH2) excitation is extracted periodically in the normal driving procedure to determine the slope of the back electromotive force signal to know the rotation direction.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A fixed rotation direction start-up method for single-phase sensorless DC brushless motor, comprising the following steps:
   Step S101: powering up to activate a motor control circuit of a motor;
   Step S102: confirming whether the motor is in a rotating state before activation of an excitation by measuring whether an induced back electromotive force signal (a terminal voltage difference between two terminals of the motor) is greater than a predetermined threshold or not; proceeding to step S103 if the induced back electromotive force signal is greater than the predetermined threshold; otherwise, executing a static start-up procedure;
   Step S103: determining a rotation direction of the motor by calculating a slope of the back electromotive force signal; and
   Step S104: determining whether the rotation direction of the motor conforms to a predetermined direction; if yes, executing a normal driving procedure; otherwise, executing the static start-up procedure;
   wherein based on a waveform of the back electromotive force signal, when a left peak of the waveform is lower than a right peak, the back electromotive force signal has a positive slope, indicating that the rotation direction is clockwise; and conversely, when the left peak is higher than the right peak, the back electromotive force signal has a negative slope, indicating that the rotation direction is counterclockwise.

2. The fixed rotation direction start-up method for single-phase sensorless DC brushless motor as claimed in claim 1, wherein the static start-up procedure comprises:
   step S110: discharging remnant energy;
   step S111: confirming that the motor has having no remnant energy; if yes, executing
   step S112; otherwise, returning to step S110;
   step S112: performing a first phase (PH1) excitation and calibrating a rotor of the motor;
   step S113: stopping the first phase excitation;
   step S114: performing a strong second phase (PH2) excitation;
   step S115: confirming whether an expected commutation condition occurs; if yes, executing the normal driving procedure; otherwise, performing step S116; and
   S116: confirming whether a predetermined waiting time is exceeded;
   if yes, returning to step S110; otherwise, returning to step S115.

3. The fixed rotation direction start-up method for single-phase sensorless DC brushless motor as claimed in claim 1, wherein the normal driving procedure comprises:
   Step S120: waiting for commutation;
   Step S121: performing first phase excitation;
   Step S122: waiting for commutation;
   Step S123: performing second phase excitation.

4. The fixed rotation direction start-up method for single-phase sensorless DC brushless motor as claimed in claim 2, wherein when calibrating the rotor of the motor, ramp-up and ramp-down excitation voltages are used to avoid oscillation jitter of the single-phase sensorless DC brushless motor.

5. The fixed rotation direction start-up method for single-phase sensorless DC brushless motor as claimed in claim 2, wherein in step S114, the strong second phase excitation means that an excitation voltage higher than the excitation voltage at the first phase excitation is provided to the motor terminals in the second phase excitation.

6. The fixed rotation direction start-up method for single-phase sensorless DC brushless motor as claimed in claim 2, wherein in step S115, the step of confirming whether the expected commutation condition occurs is realized by detecting whether or not the terminal voltage difference between the two terminals of the motor is zero.

7. The fixed rotation direction start-up method for single-phase sensorless DC brushless motor as claimed in claim 3, wherein in steps S121 and S123, excitation voltages of a same magnitude and opposite directions are provided to the motor terminals in the first phase excitation and the second phase excitation.

8. The fixed rotation direction start-up method for single-phase sensorless DC brushless motor as claimed in claim 3, wherein in steps S120 and S122, the step of waiting for commutation is realized by detecting whether or not the terminal voltage difference between the two terminals of the motor is zero.

9. The fixed rotation direction start-up method for single-phase sensorless DC brushless motor as claimed in claim 3, wherein steps S120-123 form a cyclic loop.

10. A fixed rotation direction start-up method for single-phase sensorless DC brushless motor, comprising the following steps:
   Step S101: powering up to activate a motor control circuit of a motor;
   Step S102: confirming whether the motor is in a rotating state before activation of an excitation; proceeding to step S103 if the motor is in the rotating state; otherwise, executing a static start-up procedure;
   Step S103: determining a rotation direction of the motor; and
   Step S104: determining whether the rotation direction of the motor conforms to a predetermined direction; if yes, executing a normal driving procedure; otherwise, executing the static start-up procedure;
   wherein the fixed rotation direction start-up method for a single-phase sensorless DC brushless motor further comprises: extracting a first phase or a second phase back electromotive force (BEMF) signal periodically in the normal driving procedure, and determining a slope of the BEMF signal to determine the rotation direction of the motor.

* * * * *